Patented July 5, 1938

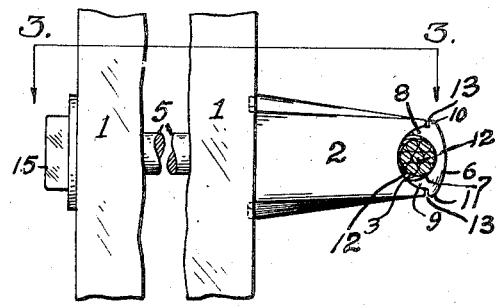

2,123,051

UNITED STATES PATENT OFFICE 2,123,051

HIGHWAY GUARD FIXTURE

Freeman W. Kennedy, Montclair, N. J., assignor to Malleable Iron Fittings Company, Branford, Conn., a corporation of Connecticut Application January 2, 1937, Serial No. 118,887

1 Claim. (Cl. 248—66)

My invention relates to highway guard fixtures, and has for its object to improve on the construction shown and described in Letters Patent No. 1,788,501, issued to Rolland G. Williams January 13, 1931.

Further objects are to readily enable the fixture to tightly clamp the usual highway cables to each individual post, or to allow the cables to run freely through the fixtures, it being understood that the cables are anchored and tightened by turnbuckles on other similar devices before said cables are clamped to or allowed to run freely through the fixtures, and also to clamp the fixtures to the posts by means of a nut threaded on a bolt rigid with the inner clamping member, or to provide said member with a hollow interiorly threaded shank into which the inner threaded end of the bolt is driven by the rotation of a suitable head rigid with the end of the bolt on the backside of the post. When a nut is used it will be obvious that the threaded end of the bolt will project beyond the nut on the backside of the post which is objectionable in some instances, whereas, when the bolt is threaded within a shank rigid with the inner clamping member only the head of the bolt will appear at the backside of the post.

In the accompanying drawing,—

Figure 1 is a side elevation of that form of my improvement designed to tightly grip the cable, the post being broken away and the cable sectioned.

Figure 2 is a similar view of another form of my improvement designed for a free running cable.

Figures 3 and 4 are sections at the lines 3 and 4 respectively of the structures shown at Figures 1 and 2.

Figure 5 is a section at line 5—5 of Figure 3.

Figure 6 is a section at line 6—6 of Figure 4.

In the following description similar numerals of reference will be used to designate like parts in the several figures of the drawing.

1 is any suitable post which may be made of wood or metal of any desired shape in cross-section. In the present instance these posts are made of wood such as is preferably used in highway guard fixtures.

Referring to Figures 1, 3 and 5, 2 is a base whose inner edge conforms to the post 1 and whose outer edge is crescent shaped, as shown at 3, and this base has a bolt receiving opening 4.

5 is a bolt which extends through this opening 4 and has a head 6, which normally faces the highway, the inner surface of said head being hook-shaped, as seen at 7, and complementary to the crescent part 3 and having lips 8, 9 that enter said part 3 and shoulders 10, 11, that are spaced from the edges of said part 3 and prevent a too severe biting on the cable 12 should said head be subjected to a violent impact.

Ordinarily, the bolt is projected, the cable inserted within the hook, and the bolt then retracted so that the cable is between the part 3 and said hook, preparatory to the firm clamping of the cable.

In some instances there is a requirement that the cable be clamped firmly at each individual post, and the constructions shown at Figures 1, 3 and 5, meet this requirement, since, when the bolt has been firmly fixed to the post, the cable will be clamped tightly between the hook and the part 3, and there will be a space between the shoulders 10, 11 and the edges of this part 3, as shown at 13, since the bite must be against the cable.

It is immaterial whether the clamping of the fixture to the post is effected as shown in Figures 1, 3 and 5, or as shown in Figures 2, 4 and 6, although some highway state commissioners insist on the construction shown at Figures 1, 3 and 5, because there is no projection of the bolt proper beyond the rear of the post, and in the structure shown in these last mentioned figures, the hook member preferably has extending therefrom a hollow interiorly threaded shank 14, while the bolt is threaded at its inner end to engage the threads of this shank and has at its rear end a rigid head 15 that is turned by a wrench to effect the clamping of the fixture to the post. Should the bolt be rigid with the hook member and threaded at its outer end, as shown at Figures 2, 4 and 6, the same results would be attained as in the instance of the structure shown at Figures 1, 3 and 5, and in both structures the cable may be tightly clamped between the hook element and the part 3, or free running, as may be desired.

In explanation of this, it will be clear that the lips 8, 9, extend farther within the part 3 when the cable is tightly clamped, and do not extend so far within said part when the cable is loose running, and this is regulated by the extent of the edges of the part 3, or by the location of the shoulders 10, 11, further away from or nearer to these edges.

For instance, referring to Figures 1, 3 and 5, if the edges of the part 3 were extended to a predetermined degree, the shoulders 10, 11, would abut said edges so that the cable could not be clamped but would be free running, or, if these edges were not extended and the shoulders located farther inward, or normally closer to these edges, the same result would be attained.

And referring to the structure shown at Figures 2, 4 and 6, if the edges of the part 3 were retracted, the lips 8, 9 would enter farther within the part 3 and the cable could be clamped, since this would prevent the abutment of these shoulders and edges.

In other words, the cable opening between the hook and part 3 can be made more or less by the location or extent of these shoulders and edges.

In all instances the cables are tautened at the end posts before any clamping of such cables in the manner described, and also preferably before the fixtures of loose running cables are secured to the posts.

Referring particularly to Figures 2, 4 and 6, the base 2a is of any conventional form with its inner edge conformed to the post 1a, which is round in cross-section, although the lateral contour of the post is immaterial, this particular form of post being shown merely as a variation. The bolt, which is designated by 5a, is rigid with the head 6a, is threaded at its outer end and extends through said base and post, and a nut 16 is driven on said threaded end of the bolt against the post to clamp the fixture to the post. In all other respects this construction is the same as that shown in Figures 1, 3 and 5, except that the shoulders of the bolt head are shown abutted against the edges of the crescent shaped part 3 of the base, in order to show how this fixture may be adapted for a loose running cable, but, as before stated, either form of the fixture is adaptable for a tightly clamped cable or a loose running cable, and, therefore, this invention is not limited in this respect, I have illustrated and described a preferred and satisfactory embodiment of my invention, but it will be obvious that changes may be made therein, within the spirit and scope thereof as defined in the appended claim.

What is claimed is:—

In a highway guard cable fixture comprising a base member adapted to engage a post, said base member being inwardly recessed at the end thereof to form a cable receiving pocket, and means for attaching said fixture to said post, a hook member for attaching said cable to said base member, said hook member being provided with a head for closing the recess in said fixture, means for distributing the impact of a blow evenly over the edges of the recess comprising flanges on the hook member engaging the edges of the recess throughout their length.

FREEMAN W. KENNEDY.